A. J. LAYHON.
SPRING CUSHION TIRE FOR VEHICLE WHEELS.
APPLICATION FILED JAN. 3, 1911.
1,028,889. Patented June 11, 1912.
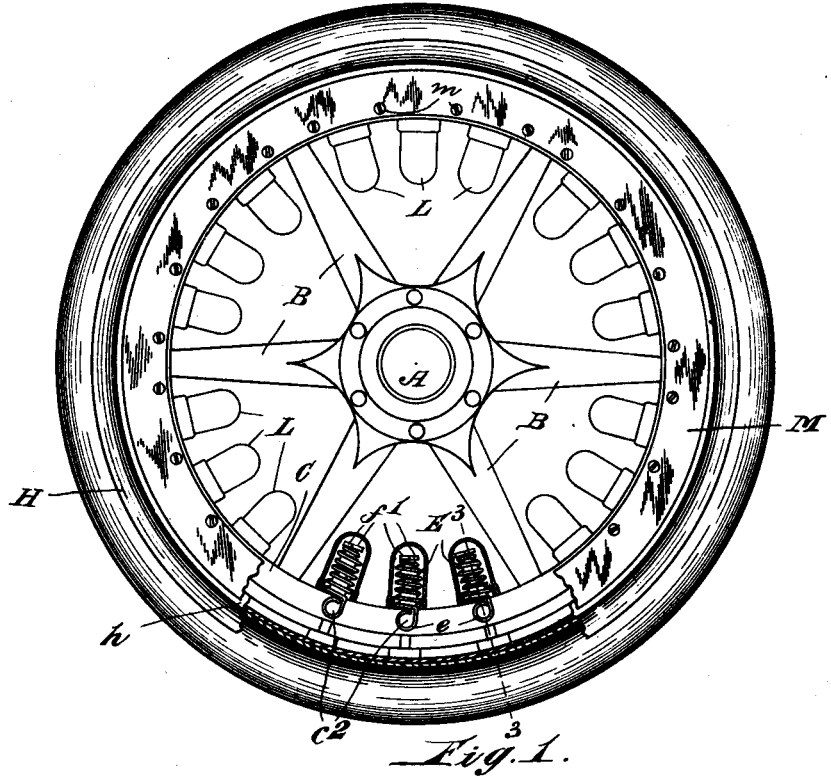
Fig. 1.
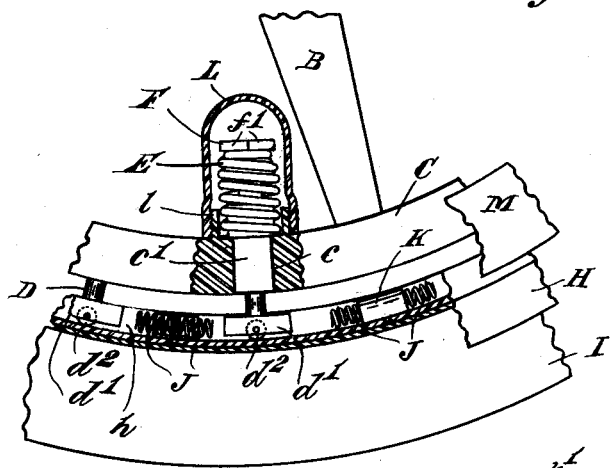
Fig. 2.
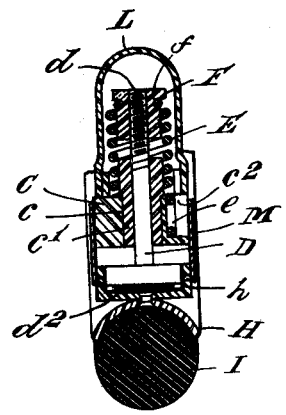
Fig. 3.
Fig. 4.
WITNESSES:
Sudger A. Nicol
Grace Crowley
INVENTOR,
Arthur J. Layhon
BY Albert M. Moore
His ATTORNEY.

UNITED STATES PATENT OFFICE.

ARTHUR J. LAYHON, OF LOWELL, MASSACHUSETTS.

SPRING-CUSHION TIRE FOR VEHICLE-WHEELS.

1,028,889.   Specification of Letters Patent.   Patented June 11, 1912.

Application filed January 3, 1911. Serial No. 600,564.

*To all whom it may concern:*

Be it known that I, ARTHUR J. LAYHON, a citizen of the United States, residing at Lowell, in the county of Middlesex and Commonwealth of Massachusetts, have invented a certain new and useful Improvement in Spring-Cushion Tires for Vehicle-Wheels, of which the following is a specification.

This invention relates to spring-cushion tires for vehicle-wheels, particularly to means for allowing the centers of the inner rim and of the outer rim and tire to recede from each other.

The general objects of the invention are to furnish a more elastic, more durable, cheaper and more readily adjustable cushion device than heretofore used.

Instead of the compressed springs heretofore used to permit the variation of position between the centers of the rims, which springs are commonly arranged in the annular space between the inner and outer rims and are therefore necessarily more limited in length, I use springs which are stretched between the inner rim and the inner end-portions of radial rods arranged to slide in the inner rim and to press against the inner surface of the outer rim, so that the inner ends of the push-rods and springs may reach nearly to the hub and the springs may have a greater length and a greater number of coils in the same length than compressed springs would have. Such springs are less liable to become "set" or lose their elasticity by stretching than the compressed springs are by over compression. I so connect the inner ends of the springs to adjusting means within the circumference of the inner rim that their tension may be readily varied without taking down the wheel. I also provide means for excluding dust and mud from the springs, push-rods and their guiding and bearing surfaces.

In the accompanying drawing, Figure 1 is a side elevation of a wheel provided with my improvement, a part of the tire and some dust-caps being in longitudinal section; Fig. 2, an enlarged side elevation, partly in longitudinal section of some of the parts shown in the lower portion of Fig. 1; Fig. 3, a radial cross-section on the line 3 3 in Fig. 1; Fig. 4, an enlarged longitudinal section of the channel or groove and the spring socket.

A indicates a hub; B, spokes; C, a rim; all of usual material and construction, except as hereinafter stated, according to the nature of the vehicle for which the wheel is intended. For an automobile the felly or rim C and spokes will preferably be of wood, connected in the usual manner to each other and to the hub. In all cases the rim C will be provided with radial perforations $c$ between adjacent spokes and if the rim be of wood these perforations will preferably be reinforced by tubular sleeves $c^1$ or bushings rigidly secured therein. Within these perforations $c$, bushings or sleeves $c^1$ are arranged push-rods D which reach entirely through the rim C and project therefrom within and without said rim, each push-rod having a sliding fit in its bushing. The portion of each push-rod which projects from the rim C toward the hub A is surrounded by a spiral spring E one end of which is connected to said rim and the other end of which engages a nut F in such a manner as to permit said nut to be turned without turning said spring. The outer end of the spring is secured to the rim C by bending the outermost coil or spiral $e$ into parallelism with the axis of the push-rod and placing said coil or spiral in a depression $c^2$ formed in the side of said rim, said depression being preferably circular except that it opens at the edge of the rim nearest the hub. The innermost coil of the spring E is smaller than the others and is laid in an annular groove $f$ in the nut F in such a manner as to allow the nut to turn freely in the spring without turning the spring or becoming detached therefrom. The part of said nut F which projects from said spring is many-sided, as shown at $f^1$ to be engaged by a wrench. The part of the push-rod which extends from the inner circumference of the rim C toward the hub is screw-threaded at $d$ and engages the nut F and the outward movement of the push-rod is limited by its engagement with the inner surface of the outer rim, so that turning the nut on said push-rod increases or diminishes the tension of the spring.

The outer rim H will be constructed according to the requirements of the wheel to which it is to be applied, but is here represented as having a concave outer portion adapted to receive a tire I which may be of solid rubber or other similar suitable yielding composition, such as are used on carriages and bicycles. As here represented, the rim H is provided with a grooved inner ring or channel piece $h$ which receives the outer end of the push-rods and allows a limited movement or partial rotation of the rim H around the rim C, such movement being limited or stopped by buffers consisting of spiral springs J arranged in tubular holders K riveted at $k$ to the outer rim and arranged within the channel of the piece $h$, the holders K being preferably divided into two chambers by a partition $k^1$. Usually there are about ten or twelve spokes in an automobile wheel having wooden fellies and spokes and it will ordinarily be sufficient in such cases to use a push-rod in each space between adjacent spokes, although a greater number may be used if desired. The outer ends of the push-rods will be flattened on the sides or otherwise suitably shaped to slide freely between the sides of the channel-piece $h$ and said push-rods are represented in the drawing as having elongated T-shaped heads $d^1$ or enlargements at their outer ends which still further guide said rods in said channel-piece and prevents said rods from being turned with the nuts F. The heads $d^1$ of the push-rods are represented in Figs. 2 and 3 as provided with anti-friction rolls $d^2$ journaled transversely in said head to facilitate the movements of said rod in the channel-piece and to prevent any noise which might be caused by the scraping of said heads on the bottom of said channel-piece.

Dust-caps L, consisting of tubes closed at their outer ends are provided at their inner ends with internal screw-threads $l$ to engage external screw-threads on the inner ends of the bushings $c^1$ to prevent dirt from getting into the springs and bushings and interfering with the operation of the push-rods.

On each side of the wheel dust-covers M, consisting of light thin sheet-metal rings are secured in any convenient manner as by screws $m$, to the inner rim C concentrically therewith, the outer edges of said dust-covers overlapping the inner edges of the sides of the channel-piece $h$ and bearing very slightly on said channel-piece, to exclude mud and dust from said channel-piece and the space between said channel-piece and said inner rim.

I claim—

1. The combination of an inner rim provided with radial perforations, an outer rim having a channel on its inner surface, push-rods arranged in said perforations to slide freely therein and having externally threaded end-portions and having heads which enter said channel and are free to slide therein without turning, springs attached at their outer ends to said inner rim, each of said springs having a reduced innermost coil, and nuts turning on the threaded portions of said push-rods and provided with annular grooves to receive said innermost coils of said springs at the inner ends thereof, to stretch said springs and to regulate the contractile force of said springs.

2. The combination of an inner rim provided with radial perforations, an outer rim having a channel on its inner surface, push-rods arranged in said radial perforations to slide freely therein and having externally threaded end-portions, and having heads which enter said channel and are free to slide therein without turning, said inner rim having lateral depressions, spiral springs having their innermost coils bent into parallelism with their axes and secured in said depressions of said inner rim, nuts swiveled to the inner ends of said springs and turning on the threaded portions of said push-rods.

3. The combination of an inner rim provided with radial perforations, an outer rim having a channel on its inner surface, push-rods arranged in said perforations to slide freely therein and having externally threaded end-portions and having heads which enter said channel and are free to slide therein without turning, elastic buffers secured in said channel between adjacent push-rods and springs to force said push-rods outward against the bottom of said channel.

In witness whereof, I have affixed my signature in presence of two witnesses.

ARTHUR J. LAYHON.

Witnesses:
ALBERT M. MOORE,
GRACE CROWLEY.